United States Patent [19]

Guttag et al.

[11] Patent Number: 5,375,198
[45] Date of Patent: Dec. 20, 1994

[54] PROCESS FOR PERFORMING A WINDOWING OPERATION IN AN ARRAY MOVE, A GRAPHICS COMPUTER SYSTEM, A DISPLAY SYSTEM, A GRAPHIC PROCESSOR AND A GRAPHICS DISPLAY SYSTEM

[75] Inventors: Karl M. Guttag, Houston; Michael D. Asal, Sugarland, both of Tex.; Mark F. Novak, Colorado Springs, Colo.

[73] Assignee: Texas Instruments Incorporated, Dallas, Tex.

[21] Appl. No.: 161,705

[22] Filed: Dec. 3, 1993

Related U.S. Application Data

[63] Continuation of Ser. No. 797,488, Nov. 20, 1991, Pat. No. 5,283,863, which is a continuation of Ser. No. 631,744, Dec. 20, 1990, Pat. No. 5,077,678, which is a continuation of Ser. No. 422,427, Nov. 21, 1989, abandoned, which is a continuation of Ser. No. 317,043, Feb. 24, 1989, abandoned, which is a continuation of Ser. No. 790,299, Oct. 22, 1985, abandoned.

[51] Int. Cl.$^5$ .............................................. G06F 15/62
[52] U.S. Cl. .................................... 395/157; 395/164
[58] Field of Search ............... 395/157, 159, 161, 162, 395/164–166; 345/189, 191, 196, 118, 119, 120, 121

[56] References Cited

U.S. PATENT DOCUMENTS

| | | | |
|---|---|---|---|
| 4,257,044 | 3/1981 | Fukuoka | 340/731 |
| 4,412,296 | 10/1983 | Taylor | 364/521 |
| 4,481,594 | 11/1984 | Staggs et al. | 364/521 |
| 4,495,491 | 1/1985 | Postl | 340/709 |
| 4,598,384 | 7/1986 | Shaw et al. | 364/521 |
| 4,779,210 | 10/1988 | Katsura et al. | 364/521 |
| 5,077,678 | 12/1991 | Guttag et al. | 395/157 |
| 5,185,859 | 2/1993 | Guttag et al. | 395/164 |
| 5,283,863 | 2/1994 | Guttag et al. | 395/157 |

Primary Examiner—Heather R. Herndon
Attorney, Agent, or Firm—Lawrence J. Bassuk; Robert D. Marshall; Richard L. Donaldson

[57] ABSTRACT

The present invention is a graphics data processor which includes the capability of determining whether a defined pixel location in a graphics display is within a window in an X Y coordinate system. The respective X and Y coordinates of the selected pixel are separately compared with the window limits. The window limits are preferable expressed as the X and Y coordinates of two diagonally opposite vertexes of a rectangular window. The results of this comparison are preferable available in two forms. In a first embodiment a single data processing instruction enables the generation of a digital data word which indicates the relation of the pixel to the window. This digital word includes a separate indication of the relationship of the pixel to the vertical and horizontal window limits. This indication can be used to generate a "trivial rejection" in determining whether a line or line segment passes through the window by ANDing the results for two points on the line. In a second embodiment the window compare capability is employed to determine whether or not a destination pixel is within the window. This is useful in array move instructions in which an entire array of pixels is moved to a location in the display. The array move may be aborted if a window violation is found or the move may be modified to plot to the display only those pixels within the window. This capability enables saving a great deal of time in graphics applications in which windows are employed by reducing the overhead needed for window determinations.

35 Claims, 12 Drawing Sheets

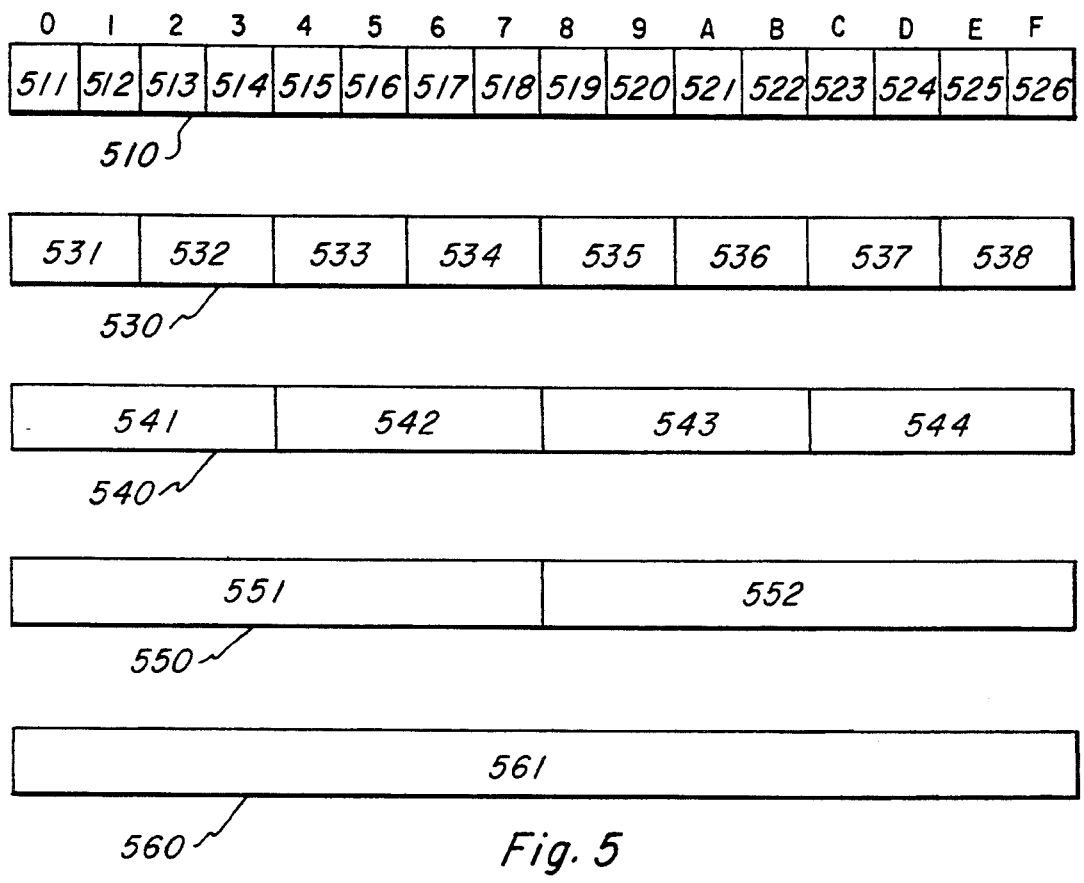
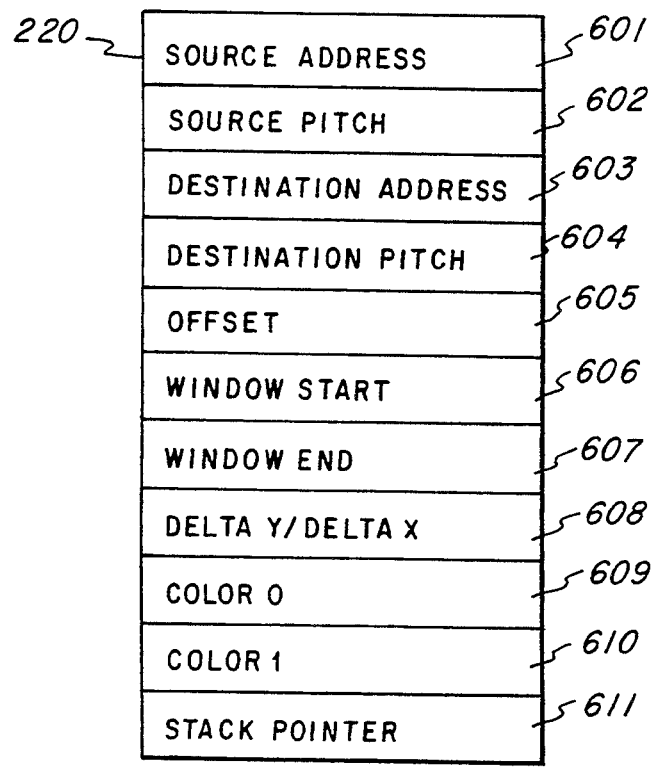
Fig. 5
Fig. 6

| 1001 | 1000 | 1010 |
| 1501 | 1502 | 1503 |
| | | ↙1520 |
| | | (Xmax, Ymax) |
| 0001 | 0000 | 0010 |
| 1504 | 1500 | 1505 |
| 1510↗ (Xmin, Ymin) | | |
| 0101 | 0100 | 0110 |
| 1506 | 1507 | 1508 |

*Fig. 15*

PROCESS FOR PERFORMING A WINDOWING OPERATION IN AN ARRAY MOVE, A GRAPHICS COMPUTER SYSTEM, A DISPLAY SYSTEM, A GRAPHIC PROCESSOR AND A GRAPHICS DISPLAY SYSTEM

This is a continuation of application Ser. No. 07/797,488 filed Nov. 20, 1991, now U.S. Pat. No. 5,283,863; which is a continuation of application Ser. No. 07/631,744 filed on Dec. 20, 1990, now U.S. Pat. No. 5,077,678; which is a continuation of application Ser. No. 07/422,427, filed on Nov. 21, 1989; which is a continuation of application Ser. No. 07/317,043, filed Feb. 24, 1989; which is a continuation of application Ser. No. 06/790,299, filed Oct. 22, 1985 all abandoned.

BACKGROUND OF THE INVENTION

The present invention relates to the field of computer graphics. In particular, this invention relates to the field of bit mapped computer graphics in which the computer memory stores data for each individual picture element or pixel of the display at memory locations that correspond to the location of that pixel on the display. The field of bit mapped computer graphics has benefitted greatly from the lowered cost per bit of dynamic random access memory (DRAM). The lowered cost per bit of memory enables larger and more complex displays to be formed in the bit mapped mode.

The reduction in the cost per bit of memory and the consequent increase in the capacity of bit mapped computer graphics has led to the need for processing devices which can advantageously use the bit mapped memory in computer graphics applications. In particular, a type of device has arisen which includes the capacity to draw simple figures, such as lines and circles, under the control of the main processor of the computer. In addition, some devices of this type include a limited capacity for bit block transfer (known as BIT-BLT or raster operation) which involves the transfer of image data from one portion of memory to another, together with logical or arithmetic combinations of that data with the data at the destination location within the memory.

These bit-map controllers with hard wired functions for drawings lines and performing other basic graphics operations represent one approach to meeting the demanding performance requirements of bit maps displays. The built-in algorithms for performing some of the most frequently used graphics operations provides a way of improving overall system performance. However, a useful graphics system often requires many functions in addition to those few which are implemented in such a hard wired controller. These additional required functions must be implemented in software by the primary processor of the computer. Typically these hard wired bit-map controllers permit the processor only limited access to the bit-map memory, thereby limiting the degree to which software can augment the fixed set of functional capacities of the hard wired controller. Accordingly, it would be highly useful to be able to provide a more flexible solution to the problem of controlling the contents of the bit mapped memory, either by providing a more powerful graphics controller or by providing better access to this memory by the system processor, or both.

SUMMARY OF THE INVENTION

The present invention relates to improvements in a graphics data processor which utilizes a windowed display. In a windowed display a special portion of the display shows subject matter from a different source than the main portion of the display. This special portion called a window is employed to display other matter of interest to the user along with the primary subject matter.

A problem associated with display windows involves the determination of what subject matter to be shown within the window. The graphic data processing apparatus must determine which portions of the source data are to be shown in specific portions of the window. This problem is particularly difficult when the source data has a greater size than the window, that is the window only displays a portion of the source data, and when the window display is to be scrolled or panned. It is necessary to determine for each pixel of the source data whether or not it fails within or outside the window. Naturally this task requires substantial computational resources and any technique to minimize this computational burden would increase the speed and efficiency of the graphic data processing apparatus.

The present invention aids in the solution of the windowing problem by providing a hardware function to determine the relationship of the coordinates of a pixel to the window limits. The pixel location is expressed in terms of X and Y coordinates. The respective X and Y coordinates of the selected pixel are separately compared with the window limits. The limits of the window are expressed in terms of the minimum and maximum values for the respective X and Y coordinates. This is preferably expressed as the coordinates of the window vertex nearest the origin of the coordinate system, having the minimum X and Y coordinates, and the vertex furthest from the origin, having the maximum X and Y coordinates.

The results of this comparison are preferably expressed in two forms. Firstly, there is an indication of the relationship of the separate coordinates of the selected pixel with the upper and lower window limits. This indiction is preferably generated in two parts corresponding to a separate determination of the X and Y coordinates. This indication can be used to generate a "trivial rejection" in determining whether a line or line segment passes through the window by ANDing the results for two points on the line. The second type of result is a yes/no indication of whether or not the pixel is within the window. This indication can be employed for control purposes when panning or scrolling graphic images within a display window.

This pixel to window comparison is preferably performed as part of instruction execution in a fully programmable graphic data processing apparatus. In a first embodiment a single data processing instruction enables the generation of a digital data word which indicates the relation of the pixel to the window. This digital word includes a separate indication of the relationship of the pixel to the vertical and horizontal window limits. This capability enables the specific hardware window compare functions to be executed from software.

In a second embodiment the window compare capability is employed to determine whether or not a destination pixel is within the window. This is useful in array move instructions in which an entire array of pixels is moved to a location in the display by memory movement of data corresponding to sequential pixels. The array move may be aborted if a window violation is found or the move may be modified to plot to the display only those pixels within the window. This capability enables saving a great deal of time in graphics applications in which windows are employed by reducing the overhead needed for window determinations.

The pixel to window comparison is performed by a comparison logic circuit. This comparison logic circuit enables the bit by bit comparison of two data words corresponding to two coordinate values. The results of this bit by bit comparison is evaluated from the most significant bit toward the least significant bit. If two corresponding bits are equal then these bits do not indicate which multibit number is greater, therefore the next most significant bit is evaluated. The most significant bit where the two input bits are not equal is employed to determine which of the two data words is greater. The hardware implementing this technique enables the rapid determination of the relationship of the two data words. Without hardware for performing the comparison function subtraction and test for greater than, equal to or less than zero would be required which employs considerably more time.

The comparison logic circuit includes a plurality of bit comparison cells, one such cell for each bit of the multibit data words. Each of these cells compares corresponding bits from two multibit data words and assumes one of three states dependent upon whether the bit from the first data word is greater than, equal to or less than the bit from the second data word. These bit compare cells are coupled together to enable a sensing circuit to determine the relationship between the two multibit data words dependent upon the relationship of the bits for the most significant bit of the multibit data words in which the corresponding bits are not equal. This is achieved by series connection of the bit compare cells and sensing from the most significant bit.

A bank of four such comparators generates a four bit data word indicating the relationship of the pixel coordinates to the window limits by comparison of the pixel X coordinates with the upper and lower X coordinate window limits and comparison of the pixel Y coordinates with the upper and lower Y coordinates of the window limits. This four bit result can be used directly or stored in a memory for later use. A logical OR of these four bits forms a single window violation signal which indicates when the pixel location is outside the window limits.

BRIEF DESCRIPTION OF THE DRAWINGS

These and other objects of the present invention will be readily understood from the following description, taken in conjunction with the drawings in which:

FIG. 5 illustrates the preferred embodiment of storage of pixel data of varying lengths within a single data word in accordance with the preferred embodiment of the present invention;

FIG. 6 illustrates the arrangement of contents of implied operands stored within the register memory in accordance with the preferred embodiment of the present invention;

FIG. 15 illustrates schematically the results returned in the window relation signal for pixels in differing memory regions in relation to the window limits.

DETAILED DESCRIPTION OF THE PREFERRED EMBODIMENT

Figure 1:
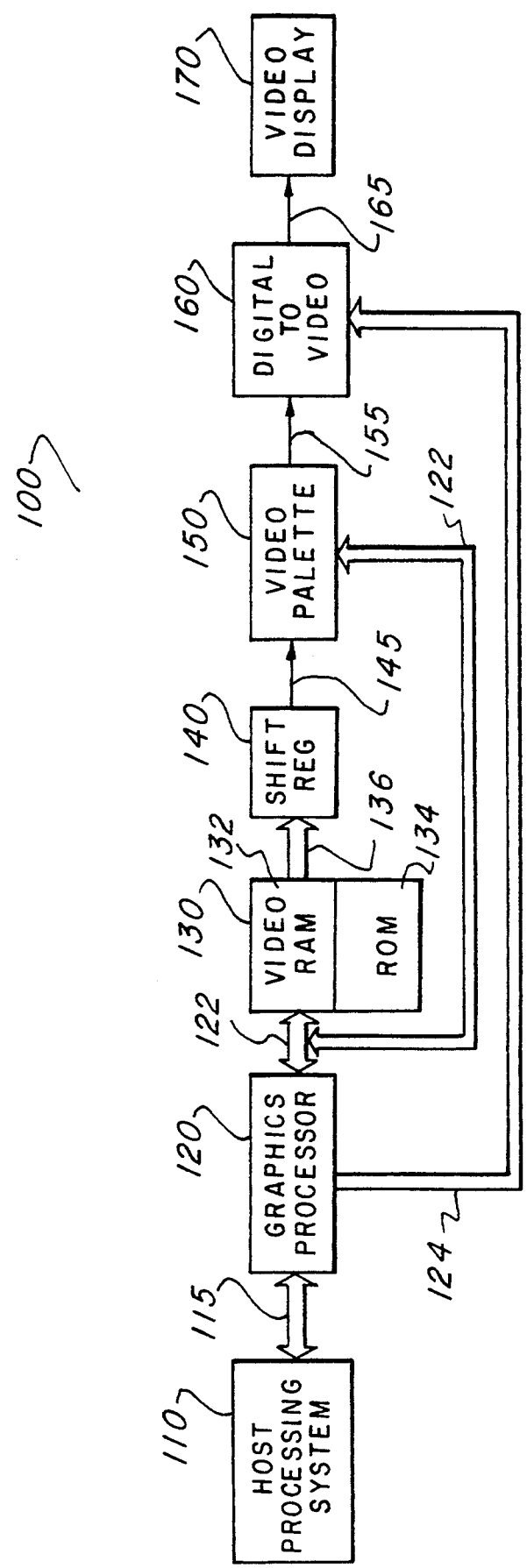
FIG. 1 illustrates a block diagram of a computer with graphics capability constructed in accordance with the principles of the present invention.

FIG. 1 illustrates a block diagram of graphics computer system 100 which is constructed in accordance with the principles of the present invention. Graphics computer system 100 includes host processing system 110, graphics processor 120, memory 130, shift register 140, video palette 150, digital to video converter 160 and video display 170.

Host processing system 110 provides the major computational capacity for the graphics computer system 100. Host processing system 110 preferably includes at least one microprocessor, read only memory, random access memory and assorted peripheral devices for forming a complete computer system. Host processing system 110 preferably also includes some form of input device, such as a keyboard or a mouse, and some form of long term storage device such as a disk drive. The details of the construction of host processing system 110 are conventional in nature and known in the art, therefore the present application will not further detail this element. The essential feature of host processing system 110, as far as the present invention is concerned, is that host processing system 110 determines the content of the visual display to be presented to the user.

Graphics processor 120 provides the major data manipulation in accordance with the present invention to generate the particular video display presented to the user. Graphics processor 120 is bidirectionally coupled to host processing system 110 via host bus 115. In accordance with the present invention, graphics processor 120 operates as an independent data processor from host processing system 110, however, it is expected that graphics processor 120 is responsive to requests from host processing system 110 via host bus 115. Graphics processor 120 further communicates with memory 130, and video palette 150 via video memory bus 122. Graphics processor 120 controls the data stored within video RAM 132 via video memory bus 122. In addition, graphics processor 120 may be controlled by programs stored in either video RAM 132 or read only memory 134. Read only memory 134 may additionally include various types of graphic image data, such as alphanumeric characters in one or more font styles and frequently used icons. In addition, graphics processor 122 controls the data stored within video palette 150. This feature will be further disclosed below. Lastly, graphics processor 120 controls digital to video converter 160 via video control bus 124. Graphics processor 120 may control the line length and the number of lines per frame of the video image presented to the user by control of digital to video converter 160 via video control bus 124.

Video memory 130 includes video RAM 132 which is bidirectionally coupled to graphics processor 120 via video memory bus 122 and read only memory 134. As previously stated, video RAM 132 includes the bit mapped graphics data which controls the video image presented to the user. This video data may be manipulated by graphics processor 120 via video memory bus 122. In addition, the video data corresponding to the current display screen is output from video RAM 132 via video output bus 136. The data from video output bus 136 corresponds to the picture element to be presented to the user. In the preferred embodiment video RAM 132 is formed of a plurality of TMS4161 64K dynamic random access integrated circuits available from Texas Instruments Corporation, the assignee of the present application. The TMS4161 integrated circuit includes dual ports, enabling display refresh and display update to occur without interference.

Shift register 140 receives the video data from video RAM 130 and assembles it into a display bit stream. In accordance with the typical arrangement of video random access memory 132, this memory consists of a bank of several separate random access memory integrated circuits. The output of each of these integrated circuits is typically only a single bit wide. Therefore, it is necessary to assemble data from a plurality of these circuits in order to obtain a sufficiently high data output rate to specify the image to be presented to the user. Shift register 140 is loaded in parallel from video output bus 136. This data is output in series on line 145. Thus shift register 140 assembles a display bit stream which provides video data at a rate high enough to specify the individual dots within the raster scanned video display.

Video palette 150 receives the high speed video data from shift register 140 via bus 145. Video palette 150 also receives data from graphics processor 120 via video memory bus 122. Video palette 150 converts the data received on bus 145 into a video level output on bus 155. This conversion is achieved by means of a lookup table which is specified by graphics processor 120 via video memory bus 122. The output of video palette 150 may comprise color hue and saturation for each picture element or may comprise red, green and blue primary color levels for each pixel. The table of conversion from the code stored within video memory 132 and the digital levels output via bus 155 is controlled from graphics processor 120 via video memory bus 122.

Digital to video converter 160 receives the digital video information from video palette 150 via bus 155. Digital to video converter 160 is controlled by graphics processor 120 via video control bus 124. Digital to video converter 160 serves to convert the digital output of video palette 150 into the desired analog levels for application to video display 170 via video output 165. Digital to video converter 160 is controlled for a specification of the number of pixels per horizontal line and the number of lines per frame, for example, by graphics processor 120 via video controller bus 124. Data within graphics processor 120 controls the generation of the synchronization and blanking signals and the retrace signals by digital to video converter 160. These portions of the video signal are not specified by the data stored within video memory 132, but rather form the control signals necessary for specification of the desired video output.

Lastly, video display 170 receives the video output from digital to video converter 160 via video output line 165. Video display 170 generates the specified video image for viewing by the operator of graphics computer system 100. It should be noted that video palette 150, digital to video converter 160 and video display 170 may operate in accordance to two major video techniques. In the first, the video data is specified in terms of color hue and saturation for each individual pixel. In the other technique, the individual primary color levels of red, blue and green are specified for each individual pixel. Upon determination of the design choice of which of these major techniques to be employed, video palette 150, digital to converter 160 and video display 170 must be constructed to be compatible to this technique. However, the principles of the present invention in regard to the operation of graphics processor 120 are unchanged regardless of the particular design choice of video technique.

Figure 2:
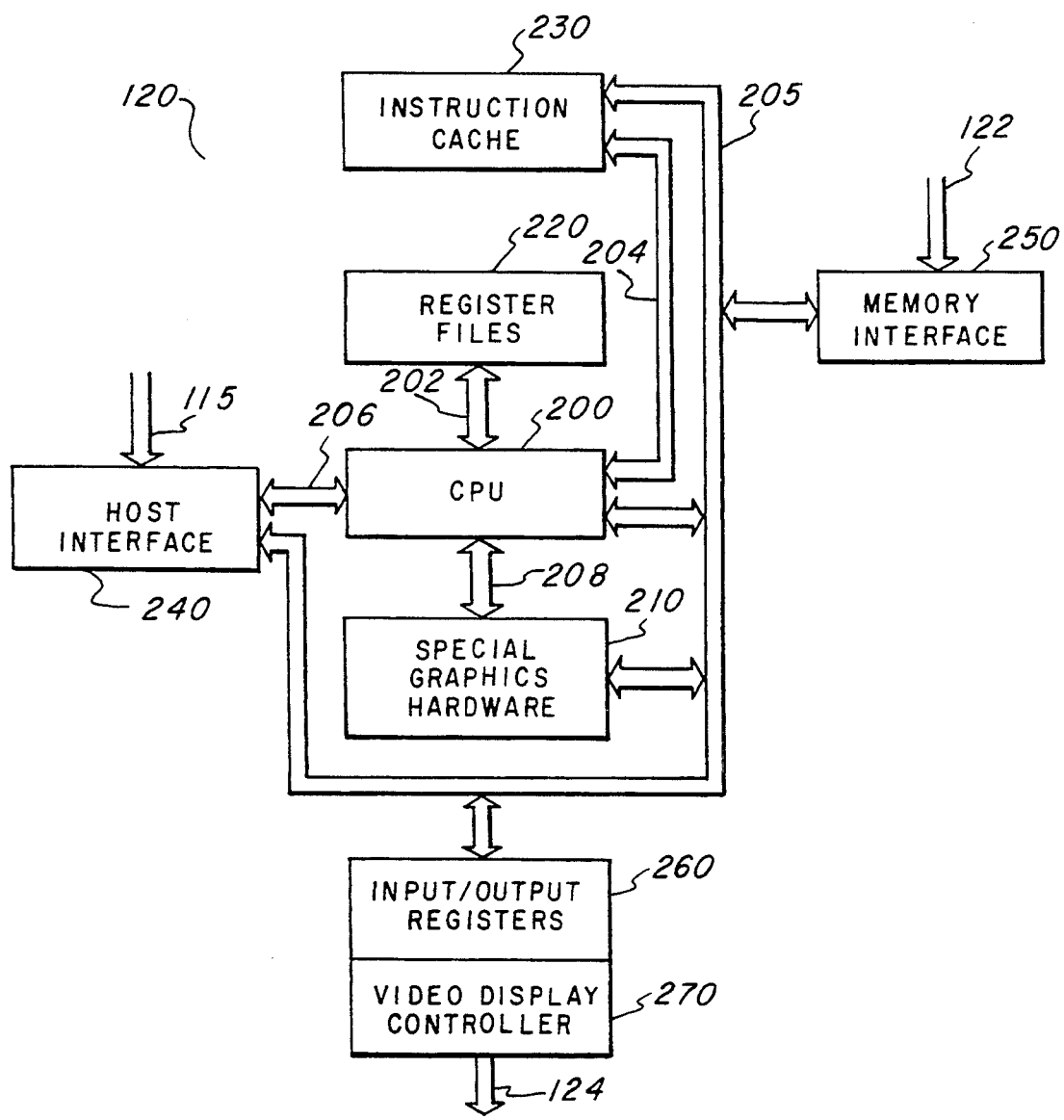
FIG. 2 illustrates the block diagram of a preferred embodiment of the graphics processing circuit of the present invention.

FIG. 2 illustrates graphics processor 120 in further detail. Graphics processor 120 includes central processing unit 200, special graphics hardware 210, register files 220, instruction cache 230, host interface 240, memory interface 250, input/output registers 260 and video display controller 270.

The heart of graphics processor 120 is central processing unit 200. Central processing unit 200 includes the capacity to do general purpose data processing including a number of arithmetic and logic operations normally included in a general purpose central processing unit. In addition, central processing unit 200 controls a number of special purpose graphics instructions, either alone or in conjunction with special graphics hardware 210.

Graphics processor 120 includes a major bus 205 which is connected to most parts of graphics processor 120 including the central processing unit 200. Central processing unit 200 is bidirectionally coupled to a set of register files including a number of data registers, via bidirectional register bus 202. Register files 220 serve as the depository of the immediately accessible data used by central processing unit 200. As will be further detailed below, register files 220 includes in addition to general purpose registers which may be employed by central processing unit 200, a number of data registers which are employed to store implied operands for graphics instructions.

Central processing unit 200 is connected to instruction cache 230 via instruction cache bus 204. Instruction cache 230 is further coupled to general bus 205 and may be loaded with instruction words from the video memory 130 via video memory bus 122 and memory interface 250. The purpose of instruction cache 230 is to speed up the execution of certain functions of central processing unit 200. A repetitive function or function that is used often within a particular portion of the program executed by central processing unit 200 may be stored within instruction cache 230. Access to instruction cache 230 via instruction cache bus 204 is much faster than access to video memory 130. Thus, the program executed by central processing unit 200 may be speeded up by preliminarily loading the repeated or often used sequences of instructions within instruction cache 230. Then these instructions may be executed more rapidly because they may be fetched more rapidly. Instruction cache 230 need not always contain the same sets of instructions, but may be loaded with a particular set of instructions which will be often used within a particular portion of the program executed by central processing unit 200.

Host interface 240 is coupled to central processing unit 200 via host interface bus 206. Host interface 240 is further connected to the host processing, system 110 via host system bus 115. Host interface 240 serves to control the communication between the host processing system 110 and the graphics processor 120. Host interface 240 controls the timing of data transfer between host processing system 110 and graphics processor 120. In this regard, host interface 240 enables either host processing system 110 to interrupt graphics processor 120 or vice versa enabling graphics processor 120 to interrupt host processing system 110. In addition, host interface 240 is coupled to the major bus 205 enabling the host processing system 110 to control directly the data stored within memory 130. Typically host interface 240 would communicate graphics requests from host processing system 110 to graphics processor 120, enabling the host system to specify the type of display to be generated by video display 170 and causing graphics processor 120 to perform a desired graphic function.

Central processing unit 200 is coupled to special graphics hardware 210 via graphics hardware bus 208. Special graphics hardware 210 is further connected to major bus 205. Special graphics hardware 210 operates in conjunction with central processing unit 200 to perform special graphic processing operations. Central processing unit 200, in addition to its function of providing general purpose data processing, controls the application of the special graphics hardware 210 in order to perform special purpose graphics instructions. These special purpose graphics instructions concern the manipulation of data within the bit mapped portion of video RAM 132. Special graphic hardware 210 operates under the control of central processing unit 200 to enable particular advantageous data manipulations regarding the data within video RAM 132.

Memory interface 250 is coupled to major bus 205 and further coupled to video memory bus 122. Memory interface 250 serves to control the communication of data and instructions between graphics processor 120 and memory 130. Memory 130 includes both the bit mapped data to be displayed via video display 170 and instructions and data necessary for the control of the operation of graphics processor 120. These functions include control of the timing of memory access, and control of data and memory multiplexing. In the preferred embodiment, video memory bus 122 includes multiplexed address and data information. Memory interface 250 enables graphics processor 120 to provide the proper output on video memory bus 122 at the appropriate time for access to memory 130.

Graphics processor 120 lastly includes input/output registers 260 and video display controller 270. Input/output registers 260 are bidirectionally coupled to major bus 205 to enable reading and writing within these registers. Input/output registers 260 are preferably within the ordinary memory space of central processing unit 200. Input/output registers 260 include data which specifies the control parameters of video display controller 270. In accordance with the data stored within the input/output registers 260, video display controller 270 generates the signals on video control bus 124 for the desired control of digital to video converter 160. Data within input/output registers 260 includes data for specifying the number of pixels per horizontal line, the horizontal synchronization and blanking intervals, the number of horizontal lines per frame and the vertical synchronization and blanking intervals. Input/output registers 260 may also include data which specifies the type of frame interlace and specifies other types of video control functions. Lastly, input/output registers 260 is a depository for other specific kinds of input and output parameters which will be more fully detailed below.

Graphics processor 120 operates in two differing address modes to address memory 130. These two address modes are X Y addressing and linear addressing. Because the graphics processor 120 operates on both bit mapped graphic data and upon conventional data and instructions, different portions of the memory 130 may be accessed most conveniently via differing addressing modes. Regardless of the particular addressing mode selected, memory interface 250 generates the proper physical address for the appropriate data to be accessed. In linear addressing, the start address of a field is formed of a single multibit linear address. The field size is determined by data within a status register within central processing unit 200. In X Y addressing the start address is a pair of X and Y coordinate values. The field size is equal to the size of a pixel, that is the number of bits required to specify the particular data at a particular pixel.

Figure 3:
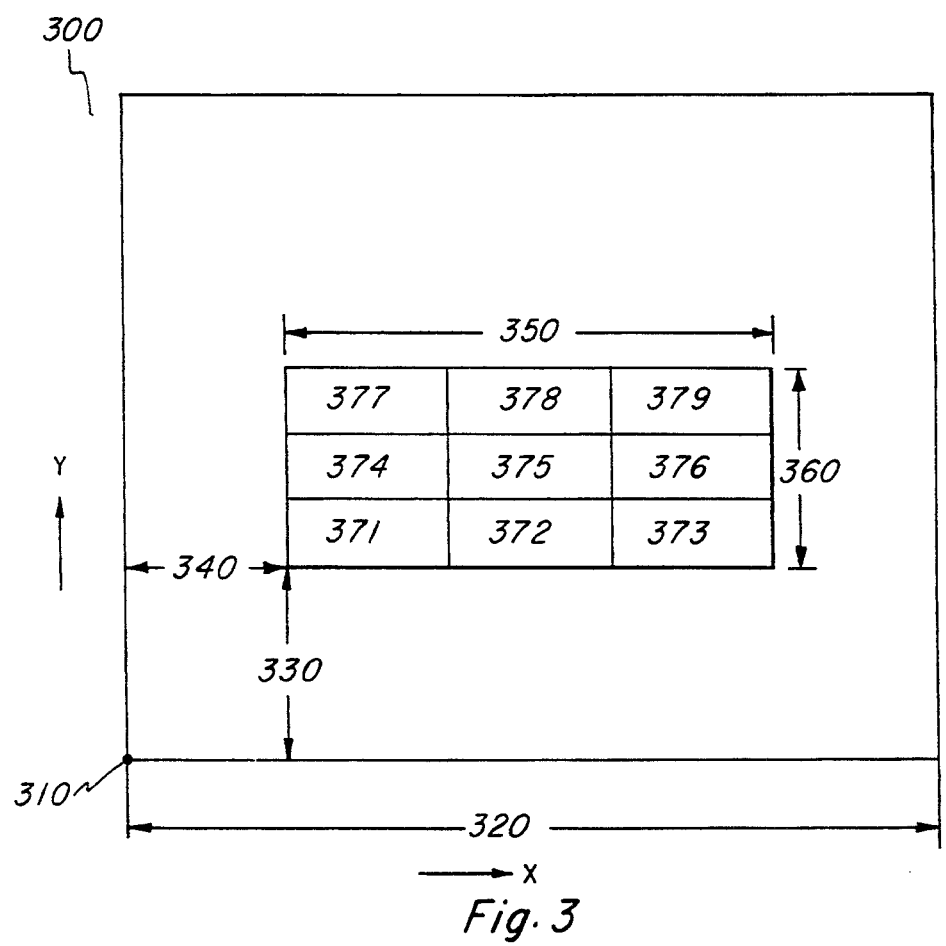
FIG. 3 illustrates the manner of specifying individual pixel addresses within the bit mapped memory in accordance with the X Y addressing technique.
Figure 4:
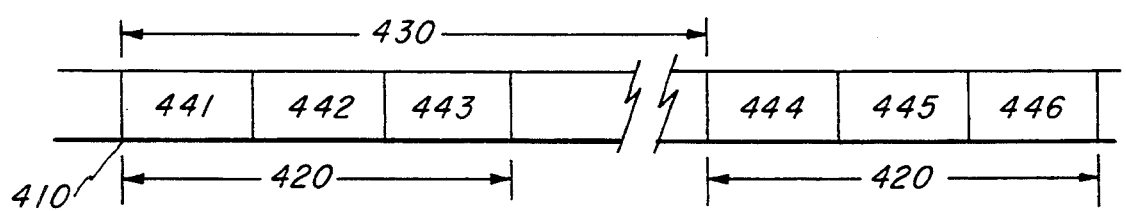
FIG. 4 illustrates a manner of specifying field addresses in accordance with the linear addressing technique.

FIG. 3 illustrates the arrangement of pixel data in accordance with an X Y addressing mode. Similarly, FIG. 4 illustrates the arrangement of similar data in accordance with the linear addressing mode. FIG. 3 shows origin 310 which serves as the reference point of the X Y matrix of pixels. The origin 310 is specified as a X Y start address and need not be the first address location within memory. The location of data corresponding to an array of pixels, such as a particular defined image element is specified in relation to the origin address 310. This includes an X start address 340 and a Y start address 330. Together with the origin. X start address 340 and Y start address 330 indicates the starting address of the first pixel data 371 of the particular image desired. The width of the image in pixels is indicated by a quantity delta X 350. The height of the image in pixels is indicated by a quantity delta Y 360. In the example illustrated in FIG. 3, the image includes nine pixels labeled 371 through 379. The last parameter necessary to specify the physical address for each of these pixels is the screen pitch 340 which indicates the width of the memory in number of bits. Specification of these parameters namely X starting address 340, Y starting address 330, delta X 350, delta Y 360 and screen pitch 320 enable memory interface 250 to provide the specified physical address based upon the specified X Y addressing technique.

FIG. 4 similarly illustrates the organization of memory in the linear format. A set of fields 441 to 446, which may be the same as pixels 371 through 376 illustrated in FIG. 3, is illustrated in FIG. 4. The following parameters are necessary to specify the particular elements in accordance with the linear addressing technique. Firstly, is the start address 410 which is the linear start address of the beginning of the first field 441 of the desired array. A second quantity delta X 420 indicates the length of a particular segment of fields in number of bits. A third quantity delta Y (not illustrated in FIG. 4) indicates the number of such segments within the particular array. Lastly, linear pitch 430 indicates the difference in linear start address between adjacent array segments. As in the case of X Y addressing, specification of these linear addressing parameters enables memory interface 250 to generate the proper physical address specified.

The two addressing modes are useful for differing purposes. The X Y addressing mode is most useful for that portion of video RAM 132 which includes the bit map data, called the screen memory which is the portion of memory which controls the display. The linear addressing mode is most useful for off screen memory such as for instructions and for image data which is not currently displayed. This latter category includes the various standard symbols such as alphanumeric type fonts and irons which are employed by the computer system. It is sometimes desirable to be able to convert an X Y address to a linear address. This conversion takes place in accordance with the following formula:

$$LA = \text{Off} + (Y \times SP + X) \times PS$$

Where: LA is the linear address; Off is the screen offset, the linear address of the origin of the X Y coordinate system; Y is the Y address; SP is the screen pitch in bits; X is the X address; and PS is the pixel size in bits. Regardless of which addressing mode is employed, memory 250 generated the proper physical address for access to memory 130.

FIG. 5 illustrates the manner of pixel storage within data words of memory 130. In accordance with the preferred embodiment of the present invention, memory 130 consists of data words of 16 bits each. These 16 bits are illustrated schematically in FIG. 5 by the hexadecimal digits 0 through F. In accordance with the preferred embodiment of the present invention, the number of bits per pixel within memory 130 is an integral power of 2 but no more than 16 bits. As thus limited, each 16 bit word within memory 130 can contain an integral number of such pixels. FIG. 5 illustrates the five available pixel formats corresponding to pixel lengths of 1, 2, 4, 8 and 16 bits. Data word 510 illustrates 16 one bit pixels 511 to 516 thus 16 one bit pixels may be disposed within each 16 bit word. Data word 530 illustrates 8 two bit pixels 531 to 538 which are disposed within the 16 bit data word. Data word 540 illustrates 4 four bit pixels 541 to 544 within the 16 bit data word. Data word 550 illustrates 2 eight bit pixels 551 and 552 within the 16 bit word. Lastly, data word 560 illustrates a single 16 bit pixel 561 stored within the 16 bit data word. By providing pixels in this format, specifically each pixel having an integral power of two number of bits and aligned with the physical word boundaries, pixel manipulation via graphics processor 120 is enhanced. This is because processing each physical word manipulates an integral number of pixels. It is contemplated that within the portion of video RAM 132 which specifies the video display that a horizontal line of pixels is designated by a string of consecutive words such as illustrated in FIG. 5.

FIG. 6 illustrates the contents of some portions of register files 220 which store implied operands for various graphics instructions. Each of the registers 601 through 611 illustrated in FIG. 6 are within the register address space of central processing unit 200 of graphics processor 120. Note, these register files illustrated in FIG. 6 are not intended to include all the possible registers within register files 220. On the contrary, a typical system will include numerous general purpose undesignated registers which can be employed by central processing unit 200 for a variety of program specified functions.

Register 601 stores the source address. This is the address of the lower left corner of the source array. This source address is the combination of X address 340 and Y address 330 in the X Y addressing mode or the linear start address 410 in the linear addressing mode.

Register 602 stores the source pitch or the difference in linear start addresses between adjacent rows of the source array. This is either screen pitch 340 illustrated in FIG. 3 or linear pitch 430 illustrated in FIG. 4 depending upon whether the X Y addressing format or the linear addressing format is employed.

Registers 603 and 604 are similar to registers 601 and 602, respectively, except that these registers include the destinations start address and the destination pitch. The destination address stored in register 603 is the address of the lower left hand corner of the destination array in either X Y addressing mode or linear addressing mode. Similarly, the destination pitch stored in register 604 is the difference in linear starting address of adjacent rows, that is either screen pitch 320 or linear pitch 430 dependent upon the addressing mode selected.

Register 605 stores the offset. The offset is the linear bit address corresponding to the origin of the coordinates of the X Y address scheme. As mentioned above, the origin 310 of the X Y address system does not necessarily belong to the physical starting address of the memory. The offset stored in register 605 is the linear start address of the origin 310 of this X Y coordinate system. This offset is employed to convert between linear and X Y addressing.

Registers 606 and 607 store addresses corresponding to a window within the screen memory. The window start stored in register 606 is the X Y address of the lower left hand corner of a display window. Similarly, register 607 stores the window end which is the X Y address of the upper right hand corner of this display window. The addresses within these two registers are employed to determine the boundaries of the specified display window. In accordance with the well known graphics techniques, images within a window within the graphics display may differ from the images of the background. The window start and window end addresses contained in these registers are employed to designate the extent of the window in order to permit graphics processor 120 to determine whether a particular X Y address is inside or outside of the window.

Register 608 stores the delta Y/delta X data. This register is divided into two independent halves, the upper half (higher order bits) designating the height of the source array (delta Y) and the lower half (lower order bits) designating the width of the source array (delta X). The delta Y/delta X data stored in register 608 may be provided in either the X Y addressing format or in the linear addressing format depending upon the manner in which the source array is designated. The meaning of the two quantities delta X and delta Y are discussed above in conjunction with FIGS. 3 and 4.

Registers 609 and 610 each contain pixel data. Color 0 data stored in register 609 contains a pixel value replicated throughout the register corresponding to a first color designated color 0. Similarly, color 1 data stored in register 610 includes a pixel value replicated throughout the register corresponding to a second color value designated color 1. Certain of the graphics instructions of graphics processor 120 employ either or both of these color values within their data manipulation. The use of these registers will be explained further below.

Lastly, the register file 220 includes register 611 which stores the stack pointer address. The stack pointer address stored in register 611 specifies the bit address within video RAM 132 which is the top of the data stack. This value is adjusted as data is pushed onto the data stack or popped from the data stack. This stack pointer address thus serves to indicate the address of the last entered data in the data stack.

Figure 7:
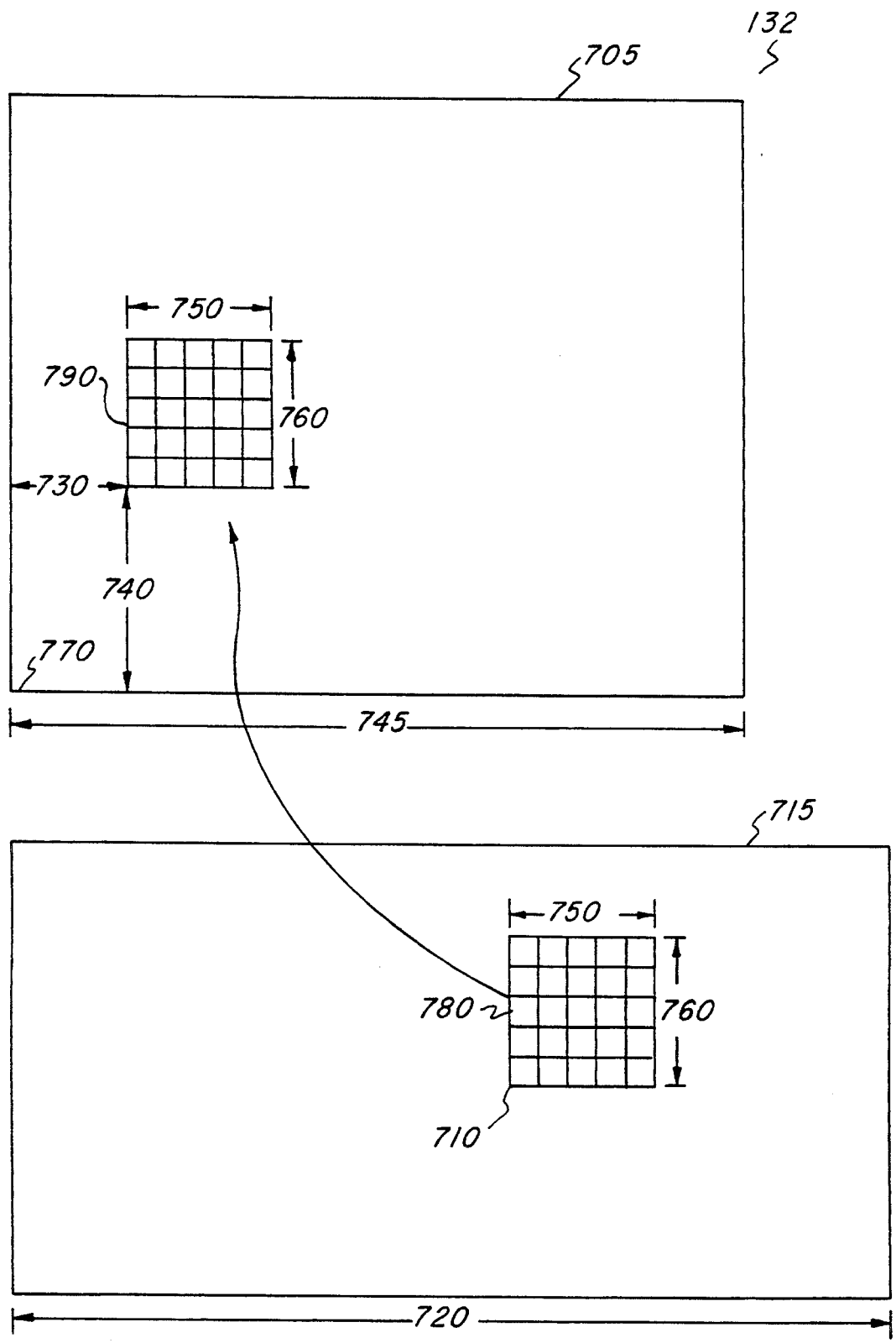
FIG. 7 illustrates the characteristics of an array move operation within the bit mapped memory of the present invention.

FIG. 7 illustrates in schematic form the process of an array move from off screen memory to screen memory. FIG. 7 illustrates video RAM 132 which includes screen memory 705 and off screen memory 715. In FIG. 7 an array of pixels 780 (or more precisely the data corresponding to an array of pixels) is transferred from off screen memory 715 to screen memory 705 becoming an array of pixels 790.

Prior to the performing the array move operation certain data must be stored in the designated resisters of register files 220. Register 601 must be loaded with the beginning address 710 of the source array of pixels. In the example illustrated in FIG. 7 this is designated in linear addressing mode. The source pitch 720 is stored in register 602. Register 603 is loaded with the destination address. In the example illustrated in FIG. 7 this is designated in X Y addressing mode including X address 730 and Y address 740. Register 604 has the destination pitch 745 stored therein. The linear address of the origin of the X Y coordinate system, offset address 770, is stored in register 605. Lastly, delta Y 750 and delta X 760 are stored in separate halves of register 608.

The array move operation illustrated schematically in FIG. 7 is executed in conjunction with the data stored in these registers of register file 220. In accordance with the preferred embodiment the number of bits per pixel is selected so that an integral number of pixels are stored in a single physical data word. By this choice, the graphics processor may transfer the array of pixels 780 to the array of pixels 790 largely by transfer of whole data words. Even with this selection of the number of bits per pixel in relation to the number of bits per physical data word, it is still necessary to deal with partial words at the array boundaries in some cases. However, this design choice serves to minimize the need to access and transfer partial data words.

In accordance with the preferred embodiment of the present invention, the data transfer schematically represented by FIG. 7 is a special case of a number of differing data transformations. The pixel data from the corresponding address locations of the source image and the destination image are combined in a manner designated by the instruction. The combination of data may be a logical function (such as AND or OR) or it may be an arithmetic function (such as addition or subtraction). The new data thus stored in the array of pixels 790 is a function of both the data of the array of pixels 780 and the current data of pixels 790. The data transfer illustrated in FIG. 7 is only a special case of this more general data transformation in which the data finally stored in the destination array does not depend upon the data previously stored there.

Figure 8:
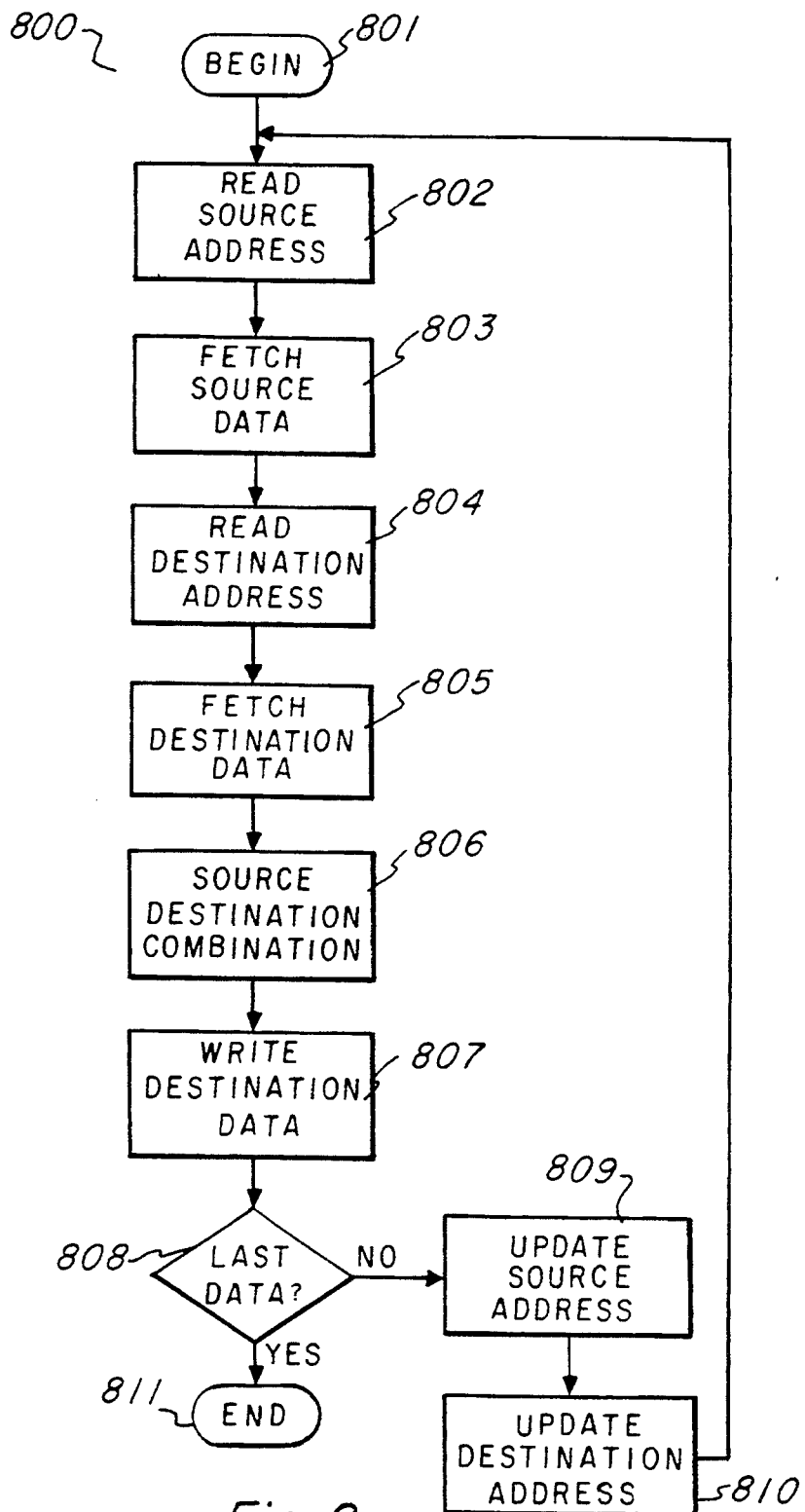
FIG. 8 illustrates a flow chart of a bit block transfer or array move operation in accordance with the present invention.

This process is illustrated by the flow chart in FIG. 8. In accordance with the preferred embodiment the transfer takes place sequentially by physical data words. Once the process begins (start block 801) the data stored in the register 601 is read to obtain the source address (processing block 802). Next graphics processor 120 fetches the indicated physical data word from memory 130 corresponding to the indicated source address processing block 803). In the case that the source address is specified in the X Y format, this recall of data would include the steps of converting the X Y address into the corresponding physical address. A similar process of recall of the destination address from register 603 (processing block 804) and then fetching of the indicated physical data word (processing block 805) takes place for the data contained at the destination location.

This combined data is then restored in the destination location previously determined (processing block 806). The source and destination pixel data are then combined in accordance with the combination mode designated by the particular data transfer instruction being executed. This is performed on a pixel by pixel basis even if the physical data word includes data corresponding to more than one pixel. This combined data is then written into the specified destination location (processing block 807).

In conjunction with the delta Y/delta X information stored in register 608, graphics processor 120 determines whether or not the entire data transfer has taken place (decision block 808) by detecting whether the last data has been transferred. If the entire data transfer has not been performed, then the source address is updated. In conjunction with the source address previously stored in register 601 and the source pitch data stored in register 602 the source address stored in register 601 is updated to refer to the next data word to be transferred (processing block 809). Similarly, the destination address stored in register 603 is updated in conjunction with the destination pitch data stored in register 604 to refer to the next data word in the destination (processing block 810). This process is repeated using the new source stored in register 601 and the new destination data stored in register 603.

As noted above the delta Y/delta X data stored in register 608 is used to define the limits of the image to be transferred. When the entire image has been transferred as indicated with reference to the delta Y/delta X data stored in register 608 (decision block 808), then the instruction execution is complete (end block 811) and graphics processor 120 continues by executing the next instruction in its program. As noted, in the preferred embodiment this process illustrated in FIG. 8 is implemented in instruction microcode and the entire data transformation process, referred to as an array move, is performed in response to a single instruction to graphics processor 120.

Figure 9:
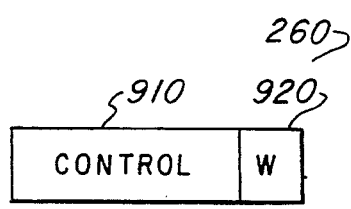
FIG. 9 illustrates a control register having window option control bits.

The windowing operation mode of the present invention utilizes a pair of special registers of graphics processor 120. These are the control register and the status register. FIG. 9 illustrates the relevant portion of the control register which is one of the input/output registers 260. Control register 910 includes a window option control portion 920. This window option control portion preferably includes two bits. Depending upon the state of these two bits graphics processor 120 performs differing windowing functions. These differing windowing functions are implied in the case of an array move such as illustrated in FIG. 8. If these two windowing function bits are "00" or "01", then no windowing takes place. If these windowing option bits are "10", then an interrupt is generated if a window violation occurs. In this case, the source pixel is moved to its destination only if it lies within the window defined by the window start and window end data stored within register files 220. If the destination is outside of the window, then an interrupt is generated and the array move is aborted. Lastly, if the window option bits are "11", then a windowed move occurs. The source pixel is moved only if its destination lies within the window. If the destination lies outside the window, then that particular pixel move is aborted. However, other pixels within the same array move will be transferred normally, if their destinations are within the window. Thus, in the array move the destination is truncated to fit within the window and only those pixels within the window are transferred.

Figure 10:
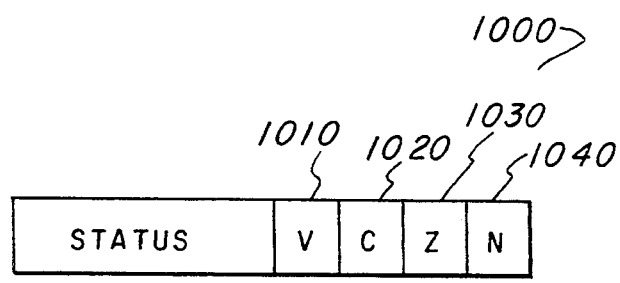
FIG. 10 illustrates a status register having bits for storage of information regarding the violation, carry, zero and negative status.

The windowing operation mode also employs a special purpose register within central processing unit 200 called the status register. FIG. 10 illustrates status register 1000 which includes numerous bits indicative of the current status of central processing unit 200. As illustrated in FIG. 10, status register 1000 includes four specific bits for denoting particular states of the central processing unit 200. These are violation/overflow bit 1010, carry bit 1020, zero bit 1030 and negative bit 1040. These individual bits are set to "1" or reset to "0" dependent upon the status of the central processing unit 200 and the particular instruction being executed. In particular with regard to the windowing technique of the present invention, violation/overflow bit 1010 is reset at the beginning of each windowing instruction. This violation/overflow bit 1010 is set to "1" if a window violation occurs. The manner in which such a window violation is detected is explained further in conjunction with the description of the windowing technique.

Figure 11:
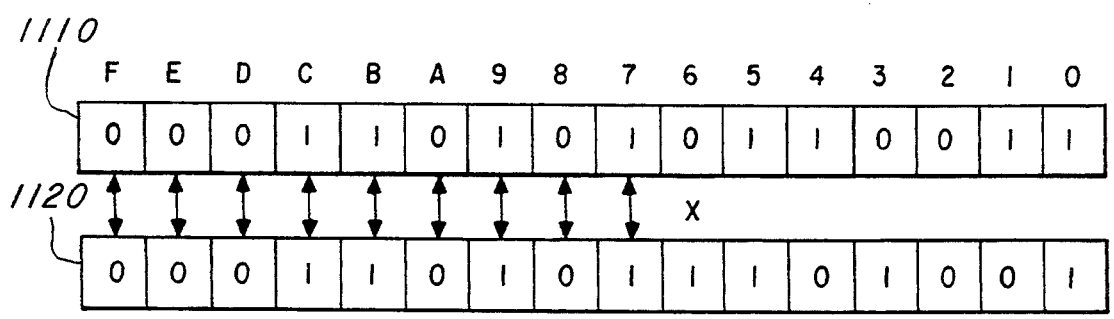
FIG. 11 illustrates schematically the technique employed in the present invention of determining which multibit data word is greater by comparison of individual bits starting at the most significant bit.

A description will first be made of a technique for determining the greater of a pair of binary numbers. The windowing technique of the present invention involves a number of such comparisons. In accordance with the preferred embodiment, the location of the pixel to be considered is expressed in the X Y addressing mode. In accordance with the preferred embodiment, the address of the pixel in question, the window start location and the window end location are all expressed as 32 bit digital numbers, with the most significant 16 bits corresponding to the Y coordinate and the least significant 16 bits corresponding to the X coordinate. In order to perform the windowing technique of the present invention using this preferred embodiment for the data types, it is necessary to make rapid comparisons of 16 bit digital numbers corresponding to coordinate values. FIG. 11 illustrates the preferred technique for making this comparison.

FIG. 11 illustrates a pair of 16 bit digital numbers 1110 and 1120. The digital numbers 1110 and 1120 are illustrated in the normal manner in which the most significant bit, here illustrated with the bit designation "F", on the left and the least significant bit, here designated as the "0" bit, on the right. A relative magnitude comparison of these two binary numbers can be made by considering corresponding bits one at a time starting with the most significant bit "F". A comparison of the "F" bits of binary numbers 1110 and 1120 indicates that these bits are both equal to "0". Therefore, this most significant bit does not indicate which of these two binary numbers is greater. Comparison is next made of the next most significant bit, in this case the "E" bit. In this case, it is seen that the "E" bit for the two digital numbers is also equal, both being equal to "0". Comparison in this manner continues to the next most significant bit through the digital word until a particular bit designation is found in which the corresponding bits of the two digital numbers are not equal. In this case, it can be seen that the "D" bits are both equal to "0", the "C" bits are both equal to "1" and so on until we reach the "6" bits. It can be seen from an inspection of digital numbers 1110 and 1120 that the "6" bits of these numbers differs. The "6" bit of 1120 equals "1" while the "6" bit of 1110 equals "0". This information immediately tells us that digital number 1120 is greater than digital number 1110. Note that it has been previously determined that all bits more significant than the "6" bit are equal. In this manner, the determination of which of these two digital numbers is greater is made based upon a single bit. In the special case in which the two digital numbers are equal, then all corresponding bits will have the same value. In this case, the "0" bits will be equal indicating that the two digital numbers are equal.

Figure 12:
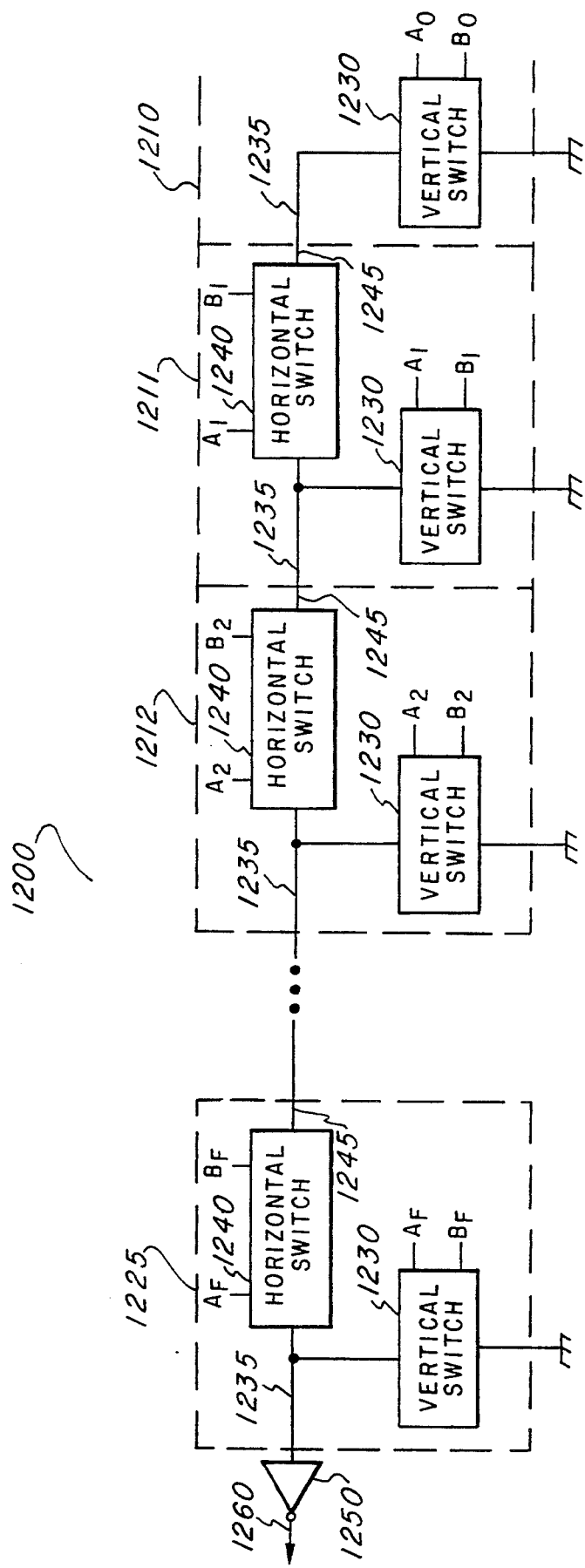
FIG. 12 illustrates a ladder circuit according to the present invention used to make the bit by bit comparison illustrated in FIG. 11.

FIG. 12 illustrates a schematic diagram of a circuit for performing the bit by bit comparison noted in FIG. 11. FIG. 11 illustrates ladder circuit 1200 including a number of bit compare cells 1210, 1211, 1212 and 1225. The intermediate bit compare cells are constructed in the same manner as illustrated for bit compare cells 1211, 1212 and 1225. These bit compare cells are disposed in series in order of ascending significance with the most significant bit compare cell connected to inverter 1250.

Each bit compare cell, with the exception of bit compare cell 1210 which corresponds to the "0" bit, includes vertical switch 1230 and horizontal switch 1240. Vertical switch 1230 is connected between an output 1235 and ground. Horizontal switch 1240 is connected between output 1235 and input 1245. Each switch in each bit compare cell receives inputs of the corresponding bit of the first and second binary numbers. In this case, the first binary number is designated $A_0$ to $A_F$ and the second binary number is designated $B_0$ to $B_F$. The bit compare cell 1210 corresponding to the "0" bit has only vertical switch 1230 and does not include horizontal switch 1240.

In each bit compare cell, vertical switch 1230 and horizontal switch 1240 are constructed in order to assume either an open or closed state depending upon the two corresponding bits from the two binary numbers to be compared. Vertical switch 1230 is constructed to be conducting only when the A bit is "1" and the B bit is "0", otherwise the vertical switch is nonconducting. Horizontal switch 1240 is constructed so that it is nonconducting only when the A bit is "0" and the B bit is "1". Otherwise horizontal switch 1240 is conducting. Inverter 1250 is constructed to detect whether there is a continuous path from the output node 1235 of bit compare cell 1225, which is the input to converter 1250, to ground. In such an event, inverter 1250 generates an output signal on output line 1260. This output signal on output line 1260 indicates that the digital word A is greater than the digital word B.

The operation of ladder circuit 1200 will now be described. If both the corresponding bits of the A and B digital numbers are "0", then the vertical switch is open and the horizontal switch is closed. The vertical switch being open does not short the output node 1235 to ground. The horizontal switch 1240 being closed causes the input node 1245 to be connected to the output node 1235 of the previous bit compare cell. This serves to make the inverter 1250 responsive to the switch state of the previous bit compare cell. The same result would take place if both the bit corresponding to the A number and the bit corresponding to the B number were equal to "1".

In the case in which the A bit is "0" and the B bit is "1", both the vertical switch 1230 and the horizontal switch 1240 are open. This prevents application of the ground to the output node 1235 of that particular bit compare cell and further prevents the state of any cells corresponding to lower significant bits from causing a ground to appear at the input of inverter 1250. This state corresponds to the case in which the digital number A is less than the digital number B.

On the other hand, if the bit from digital number A is "1" and the bit from digital number B is "0", then both the vertical switch 1230 and the horizontal switch 1240 are closed. This serves to ground the output node 1235 of that bit compare cell. There will be a continuous path to ground from the input of inverter 1250 if one of the vertical switches 1230 is closed in a bit compare cell of a more significant bit than the first bit compare cell in which horizontal switch 1240 is open.

Ladder circuit 1200 thus implements the technique illustrated in FIG. 11. If the two bits are equal, then vertical switch 1230 is open and horizontal switch 1240 is closed, causing the output node 1235 of the next most significant bit to be connected to the input of inverter 1250. Thus a continuous path is formed via horizontal switches 1240 to the first bit compare cell in which the bits from digital words A and B are unequal. If the corresponding bit from binary number A is "1" and the bit from binary data word B is "0", then the input to inverter 1250 is grounded through that vertical switch 1230. Thus, a high output is generated on output line 1260. On the other hand, if the bit from digital word A equals "0" and the bit from digital word B equals "1", then both vertical switch 1230 and horizontal switch 1240 are open. This serves to isolate the input of inverter 1250 from ground, which is interpreted as a high input signal. Therefore, inverter 1250 generates a low signal on output 1260. Note that in the ladder circuit illustrated in FIG. 12, the results will be the same if digital word A equals digital word B as if digital word B were greater than digital word A.

Figure 13:
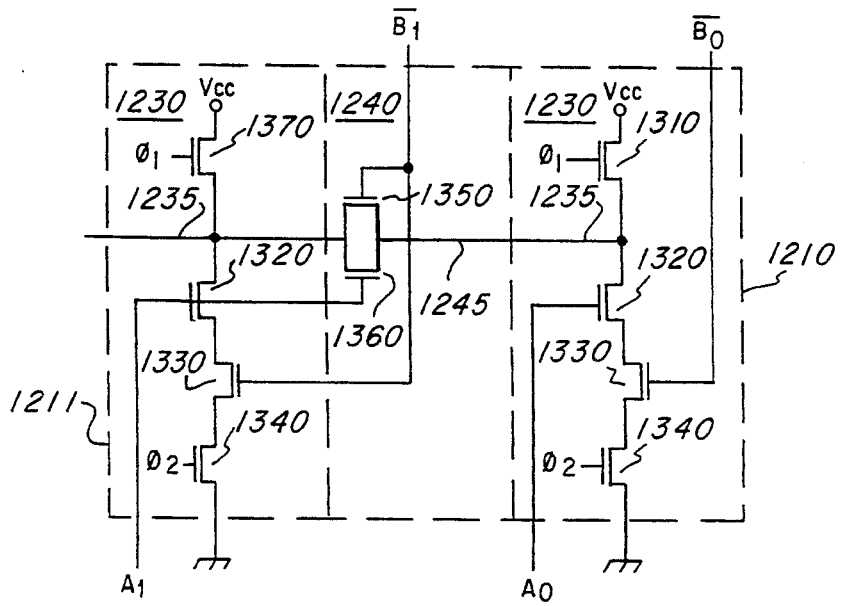
FIG. 13 illustrates the circuits employed in two illustrative stages of the ladder circuit illustrated in FIG. 12.

FIG. 13 illustrates a preferred field effect transistor circuit for embodying the exemplary bit compare cells 1210 and 1211. Other bit compare cells of ladder circuit 1200 are constructed in the same manner as bit compare cell 1211 illustrated in FIG. 13. It should be noted in FIG. 13 that each of the bits of digital word B are inverted by static inverters which are not shown.

The vertical switches 1230 operate in accordance with the well known precharge-conditional-discharge technique. During a first clock cycle 1 which does not overlap the clock cycle 2, field effect transistor 1310 is turned on. This causes charge from the voltage source $V_{CC}$ to be coupled to the output node 1235. Because the clock signal 2 causes field effect transistor 1340 to be turned off during this period, this charge has no place to go and so remains on output node 1235. During a later time due to clock signal 1, field effect transistor 1310 is turned off while field effect transistor 1340 is turned on by clock signal 2. The bit inputs to the vertical switch 1230 must be valid at this time. During this time, if the A input (such as $A_0$ or $A_1$ illustrated in FIG. 13) is a "1", field effect transistor 1320 is on. In addition, if the inverted B input is "1", then field effect transistor 1330 is also turned on. If this is the case, a continuous path is provided from output node 1235 through transistors 1320, 1330 and 1340 to ground. In this case, the charge previously stored on output node 1235 is grounded. However, under any other conditions, such as if the A input were "0" or if the inverter B input were "0", then the continuous path from output node 1235 to ground would be interrupted. In such an event, the charge would remain upon output node 1235. This circuit provides the logical function $A_I$ AND (NOT $B_I$).

Horizontal switch 1240 is a static OR circuit. The output node 1235 is coupled to the input node 1245 through the source/drain paths of two field effect transistors, 1350 and 1360. The A bit signal is applied to the gate of field effect transistor 1360. The NOT B signal is applied to the gate of field effect transistor 1350. If the A input is a "1", then field effect transistor 1360 couples output node 1235 to input node 1245. If the NOT B input signal is a "1", that is if the B input is "0", then field effect transistor 1350 couples output node 1235 to input node 1245. Thus if either the A bit is "1" or the B bit is "0", then the horizontal switch 1240 is closed. This corresponds to the logical function $A_I$ OR (NOT $B_I$).

Figure 14:
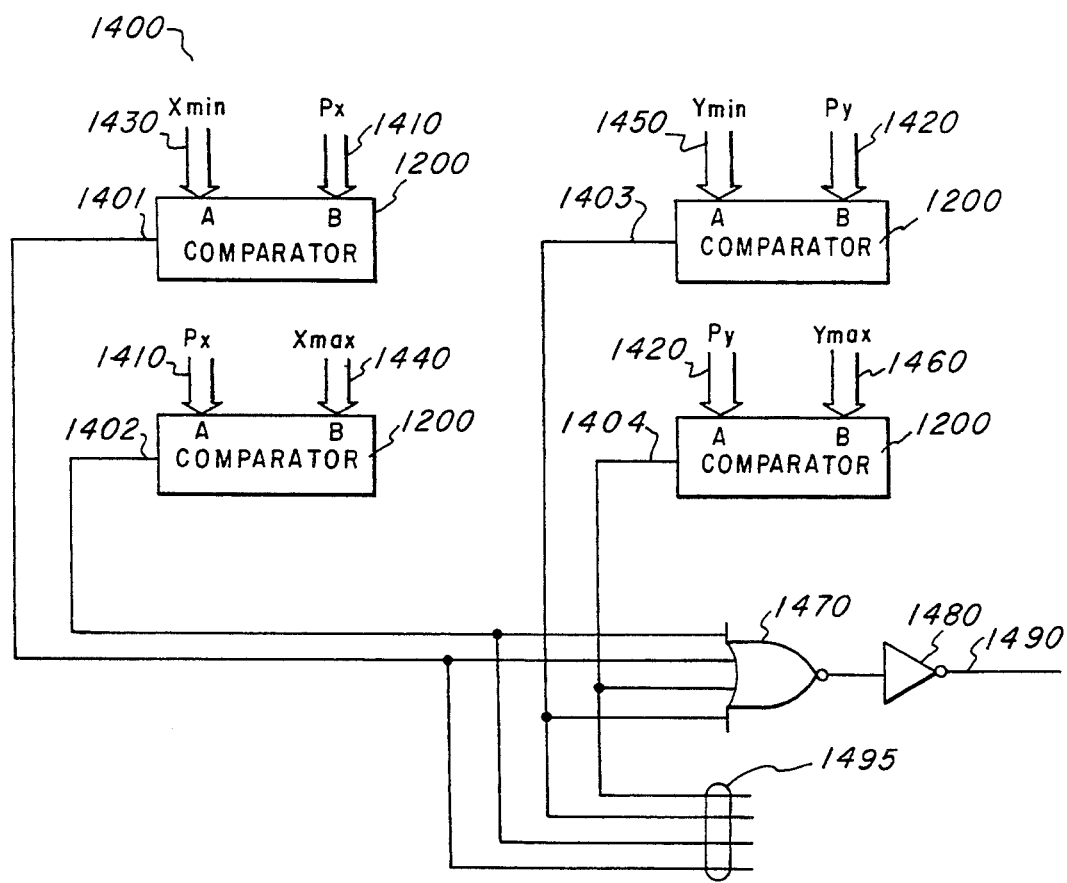
FIG. 14 illustrates the manner in which four ladder circuits such as illustrated in FIG. 12 are coupled together to provide a window violation signal and a window relation signal.

FIG. 14 illustrates a window checking circuit including four ladder circuits 1200 employed as comparators which can test to determine whether the X and Y coordinates of a pixel place it within the desired window. A first of the comparators 1200 receives as its A input the X coordinate of the window start ($X_{MIN}$) on bus 1430. As its B coordinate, it receives the X coordinate of the pixel ($P_X$) on bus 1410. This comparator 1200 generates an output on output line 1401 which has a "1" value if the X coordinate of the window start ($X_{MIN}$) is greater than the X coordinate of the pixel ($P_X$). A second comparator 1200 generates an output on output line 1402. This second comparator 1200 receives as its A input the X coordinate of the pixel ($P_X$) on bus 1410. It receives as its B input the X coordinate of the window end ($X_{MAX}$) on bus 1440. An output is generated on output line 1402 having a value "1" if the X coordinate of the pixel ($P_X$) is greater than the X coordinate of the window end ($X_{MAX}$). The third comparator 1200 generates an output on output line 1401. This comparator receives as its A input the Y coordinates of the window beginning point ($Y_{MIN}$) on bus 1450. It receives as its B input the Y coordinates of the pixel ($P_Y$) on bus 1420. Lastly, the fourth comparator 1200 generates its output on output line 1404. This last comparator receives as its A input the Y coordinates of the pixel ($P_Y$) on bus 1420. It receives as its B input the Y coordinates of the window end point ($Y_{MAX}$) on bus 1460.

The window comparison circuit 1400 illustrated in FIG. 14 generates two types of outputs. The first output is a signal window violation signal issued at output line 1490. The output lines 1401, 1402, 1403 and 1404 from each of the comparator circuits 1200 are applied as inputs to a NOR circuit 1470. The output of NOR circuit 1470 is applied to inverter 1480 which generates the output signal on output line 1490. This combination is effectively an OR circuit. The output on output line 1401 is a "1" if $X_{MIN}$ is greater than $P_X$. The output on output line 1402 is a "1" if $P_X$ is greater than $X_{MAX}$. The output on output line 1403 is a "1" if $Y_{MIN}$ is greater than $P_Y$. Lastly, the output on output line 1404 is a "1" if $P_Y$ is greater than $Y_{MAX}$. These conditions set forth the four boundaries of the rectangular window. Thus if any of the output lines 1401, 1402, 1403 or 1404 is "1", then the coordinates of the pixel in question are outside the window. In such an event, that is if any of these outputs are "1", then the pixel in question lies outside the window. In such a case, inverter 1480 generates a "1" output on output line 1490. Note that the output line 1490 is connected to the status register 1000 to set or clear the violation/overflow bit 1010 for instructions in which windowing is employed. Thus the violation/overflow bit 1010 within status register 1000 is set if the pixel location is outside the defined window.

Window checking circuit 1400 generates a second output on bus 1495. Bus 1495 is directly connected to the output lines 1401, 1402, 1403 and 1404 from the four comparator circuits 1200. The output on bus 1495 is an indication of the relationship between the pixel coordinates and the window. Each bit within bus 1495 indicates the relationship of the pixel coordinates to one of the window limits. Together these four bits indicate which of nine regions the pixel coordinates are in relationship to the defined window.

FIG. 15 illustrates the relationship between the four bits generated and the defined window. FIG. 15 illustrates window 1500 together with regions 1501 to 1508 which surround this window. FIG. 15 also illustrates the window start point 1510 having the coordinates ($X_{MIN}$, $Y_{MAX}$) and the window end point 1520 having the coordinates ($X_{MAX}$, $Y_{MAX}$). Each of these regions includes a four bit code corresponding to the output on bus 1495. The first bit corresponds to the output 1404, the second bit corresponds to the output 1403, the third bit corresponds to 1402 and the fourth bit corresponds to 1401. Note that in region 1500, the window region, the four bits are "0000". In accordance with the preferred embodiment, when the coordinates of a pixel are tested against the window limits, the four bits from bus 1495, as illustrated in FIG. 15, are stored within a specified register in register files 220. In this way the outputs for several pixels may be stored and later employed for graphics manipulation. In particular, this instruction may be used to trivially reject lines which do not intersect the window. These codes generated for two separate pixels which define the line are AND'ed together. If the result is nonzero, then the line must lie completely outside the window. A zero result indicates that the line may cross the window, therefore a more rigorous test must be applied to determine whether this line crosses the window.

Figure 16:
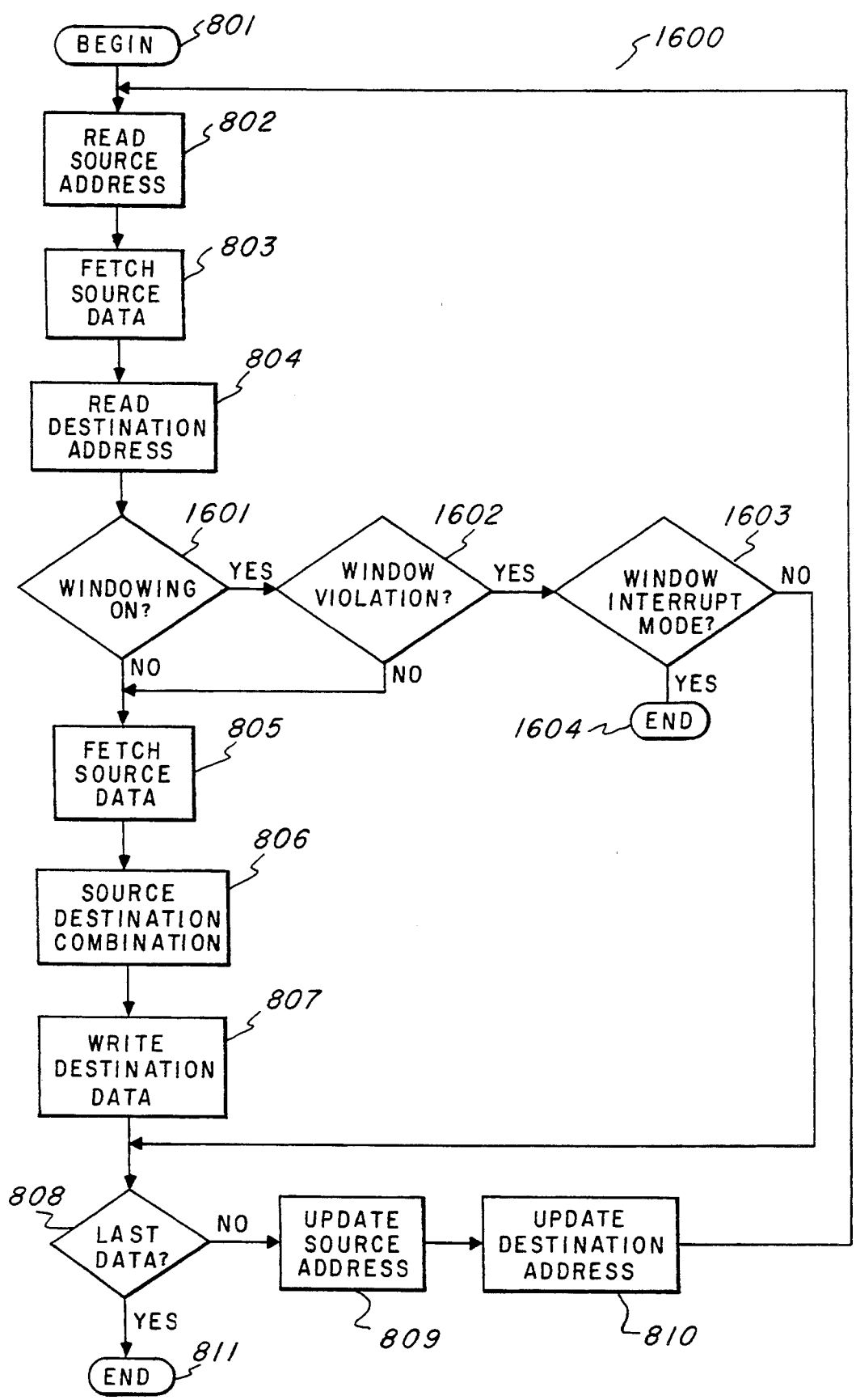
FIG. 16 illustrates a flow chart of a window checking array move instruction in accordance with one embodiment of the present invention.
Figure 17:
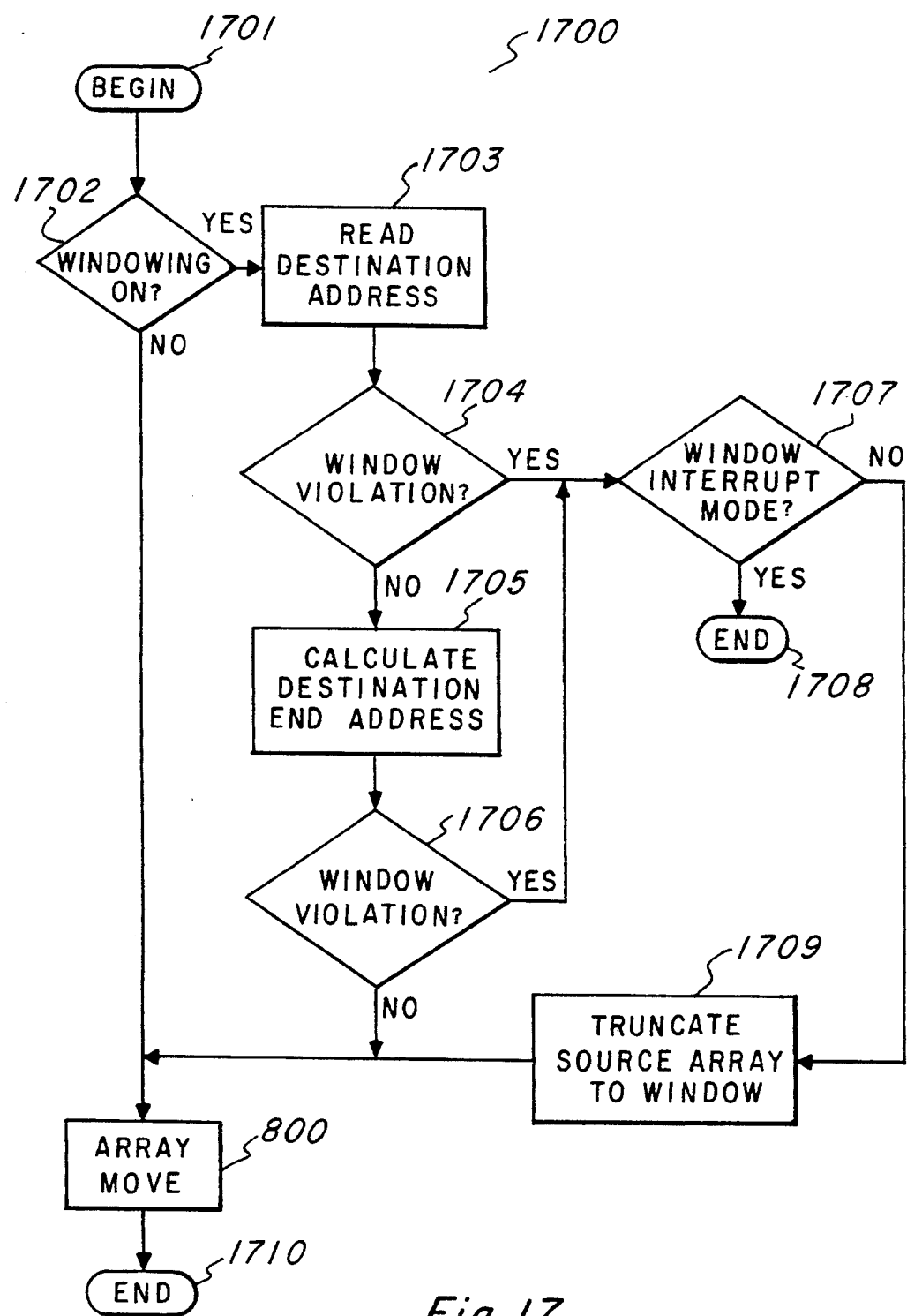
FIG. 17 illustrates a flow chart of a window checking array move instruction in accordance with an alternative embodiment of the present invention.

FIG. 16 and 17 illustrate two embodiments of the use of window checking when executing an array move such as illustrated in FIG. 8. As shown in FIG. 8, such an array move operates pixel by pixel to fetch source and destination pixels, form a combined pixel and write the combined pixel within the destination location. This process takes place on a pixel by pixel basis in a loop as illustrated in FIG. 8. FIG. 16 illustrates an embodiment in which the windowing takes place during the execution of such an array move. FIG. 17 illustrates the case in which a premove move process makes a windowing determination.

FIG. 16 illustrates flow chart 1600 showing one embodiment of the application of windowing to an array move instruction. FIG. 16 begins with start block 801 which is the same as illustrated in FIG. 8. The source address is read (processing block 802), the source data is fetched (processing block 803) and the destination address is read (processing block 804). These steps all take place in accordance with that previously illustrated in FIG. 8. Next the windowing control portion 920 of control register 910 is read to determine whether a windowing operation mode is enabled (decision block 1601). In the event that a windowing operation mode is not enabled, then flow chart 1600 proceeds in a manner previously illustrated in FIG. 5. This includes fetching the source data (processing block 805), forming the source/destination combination (processing block 806) and writing this combined data into the destination (processing block 807). In accordance with the previously illustrated array move in FIG. 8, the program then tests to determine whether the last data has been moved (decision block 808). If the last block has not been moved, then the source and destination addresses are updated (processing blocks 809 and 810), and the loop is performed again. If not, then the program is ended (end of block 811).

In the event that a windowing operation mode is enabled, the program performs several tests to determine whether or not the array move is to be altered. Firstly, the presence or absence of a window violation is tested (decision block 1602). This is achieved by applying the current destination address to the window checking circuit 1400. The output at output line 1490 indicates whether or not this pixel is within or outside the window. In the event that the pixel is within the window, that is no window violation is detected, then the array move proceeds normally in the same manner as if no windowing operation mode were enabled.

In the event that a window violation is detected, then the type of windowing operation mode is determined. Firstly, it is determined whether or not the window interrupt mode is enabled (decision block 1603). If the window interrupt mode is set, then the array move is aborted and the program ends (end block 1604). This mode is employed when it is desirable to abort the array move in the case of a window violation. On the other hand, if the window interrupt mode is not set, then the windowed move mode is set. This mode serves to truncate the array move operation to conform to the limits of the window. In this event, data is not written into the current destination address. Rather, the program proceeds to test whether or not the last data has been transferred (decision block 808) and if not, repeats this loop. In this event, the writing of the data to the destination location will be omitted each time the destination address is outside the window. Therefore, in the window move mode, only those pixels whose destination lies within the window are transferred.

FIG. 17 illustrates program 1700 which includes a premove windowing operation. This program is begun at start block 1701. Firstly, the program test to determine whether a windowing operation mode is enabled (decision block 1702). This determination is made by reading the bits of windowing control portion 920 of control register 910. In the event that windowing is off, the program proceeds to the array move program illustrated in FIG. 8 (bus is in block 800). Once this array move is completed, the program ends (end block 1710).

In the event that a windowing operation mode is enabled, then several processes take place to alter the parameters of the array move. Firstly, the destination address is read (processing block 1703). This is achieved by recalling the address stored within register 603 of register files 220. This destination address is the address of the first pixel in the destination array. Program 1700 then tests for a window violation (decision block 1704). This is performed by applying the destination address just read to the window checking circuit 1400. The output at output line 1490 indicates whether or not this pixel is within the window. Program 1700 next calculates the destination end address (processing block 1705). This calculation is achieved using the destination address originally stored within register 603 and the delta Y/delta X information originally stored in register 608. Next the program test to determine whether this destination end address is within the window (decision block 1706). This achieved by applying this destination end address to window checking circuit 1400. In the event that no window violation is detected for the destination begin address and the destination end address, it is assured that the entire destination array lies within the defined window. Therefore, the array move is executed normally.

In the event that a window violation is detected, either from the destination begin address or the destination end address, then program 1700 tests to determine the windowing operation mode (decision block 1707). If the window control portion 920 of control register 910 indicate the window interrupt mode, then the array move is aborted (end block 1708). Please note that this array move is aborted prior to the transfer of any data. However, in the event that the window interrupt mode is not selected then the windowing move mode has been selected. In such a case the limits of the source array are truncated so that the destination array fits within the window (processing block 1709). This involves resetting the source address stored within register 601 and the destination address stored within register 603 to correspond to the window start address in register 606. In addition, it may require alteration of the delta Y/delta X information stored within register 608 in order to insure that the destination array conforms to the window. After this transformation has been made then the array move is executed normally. This serves to insure that only those pixels whose destination address falls within the defined window are transferred.

Although the present invention has been described in conjunction with 16 bit X and Y coordinates formed in 32 bit data words, those skilled in the art understand that this limitation is merely a matter of convenience. Other larger or smaller number of bits per data word is possible utilizing the principles of the present invention.

The claims are:

1. A process for performing a windowing operation in a destination array of addressable data relative to a source array of addressable data, said process comprising:

A. reading an address of a selected location in the destination array;
   B. testing in special graphics hardware circuits whether the selected location in the destination array is within a defined window within said destination array; and
   C. truncating the source array to the window upon the selected location in the destination array being outside the defined window.

2. The process of claim 1 in which the truncating includes setting the start and end addresses of the source and destination arrays to the window.

3. The process of claim 1 including transferring only those pixels whose destination address falls within the window.

4. The process of claim 1 including determining whether a window interrupt mode is set upon testing the selected location in the destination array to be outside the defined window.

5. The process of claim 1 including performing the truncating before moving an array.

6. A process for performing a windowing operation in an array move that normally moves pixel data from a source array to a destination array, there being a window in said destination array, the window being defined by window coordinate data, the process comprising:

A. reading a destination begin address that defines the address of the first pixel in the destination array;
   B. testing the destination begin address for a window violation;
   C. calculating a destination end address that defines the address of the last pixel in the destination array;
   D. testing the calculated destination end address for a window violation; and
   E. truncating the source array to the window upon either the destination read address or the calculated destination end address being outside of the window.

7. The process of claim 6 in which the truncating includes setting the start and end addresses of the source and destination arrays to the window.

8. The process of claim 6 including transferring only those pixels whose destination address falls within the window.

9. The process of claim 6 including determining whether a window interrupt mode is set upon testing for a window violation.

10. The process of claim 6 including performing the truncating before moving the array.

11. A process for performing an array move that normally moves pixel data from a location in a source array to a location in a destination array, there being in said destination array a window defined by window coordinate data, said process comprising:

A. testing whether a windowing operation is selected;
   B. testing whether a window violation occurs;
   C. truncating the source array to the window; and
   D. moving the truncated source array to the destination array.

12. A graphics computer system comprising:

A. a host processing system including at least one microprocessor, read only memory, random access memory and assorted peripheral devices for forming a complete computer system, said host processing system furnishing host data determining the content of a visual image to be presented;
   B. graphics memory circuits including random access memory and read only memory, said random access memory storing bit mapped display data signals representing said visual image and storing said host data, said random access memory and said read only memory both storing instruction signals used for processing said host data and said display data;

C. video display circuits connected to said random access memory, said video display circuits forming said visual image in response to receipt of said display data; and D. graphics processor circuits including:
   i. central processing unit circuits performing general purpose data processing, including a number of arithmetic and logic operations normally included in a general purpose processing unit, by executing said instructions accessed from said graphics memory circuits, said central processing unit circuits processing at least said host data to produce said display data in response to executing said instructions; and
   ii. special graphics hardware circuits connected to said central processing unit circuits and operating in conjunction with and under control of the central processing unit circuits to process at least the host data in producing the display data, the special graphics hardware circuits including window checking circuits producing at least one output signal indicating the location of a pixel in one of a window and plural regions surrounding said window defined in an addressable destination array of pixels of said display data; and
   iii. the central processing unit circuits and the special graphics hardware circuits operating to truncate the addresses of a source array of pixel data to the addresses of the window in the destination array while performing an array move when at least part of the destination addresses occur outside of the window.

13. The graphics computer system of claim 12 in which the window checking circuits indicate whether the addresses of the source array occurs outside of the window in the destination array.

14. The graphics computer system of claim 12 in which the truncating includes setting the start and end addresses of the source and destination arrays to the window.

15. The graphics computer system of claim 12 in which the array move includes transferring only the pixel data whose destination addresses fall within the window.

16. A graphics computer system comprising:
A. graphics memory circuits including random access memory and read only memory, said random access memory storing bit mapped display data signals representing said visual image and storing said host data, said random access memory and said read only memory both storing instruction signals used for processing said host data and said display data;

B. video display circuits connected to said random access memory, said video display circuits forming said visual image in response to receipt of said display data; and C. graphics processor circuits including:
   i. central processing unit circuits performing general purpose data processing, including a number of arithmetic and logic operations normally included in a general purpose processing unit, by executing said instructions accessed from said graphics memory circuits, said central processing unit circuits processing at least said host data to produce said display data in response to executing said instructions; and
   ii. special graphics hardware circuits connected to said central processing unit circuits and operating in conjunction with and under control of the central processing unit circuits to process at least the host data in producing the display data, the special graphics hardware circuits including window checking circuits producing at least one output signal indicating the location of a pixel in one of a window and plural regions surrounding said window defined in an addressable destination array of pixels of said display data; and
   iii. the central processing unit circuits and the special graphics hardware circuits operating to truncate the addresses of a source array of pixel data to the addresses of the window in the destination array while performing an array move when at least part of the destination addresses occur outside of the window.

17. The graphics computer system of claim 16 in which the window checking circuits indicate whether the addresses of the source array occurs outside of the window in the destination array.

18. The graphics computer system of claim 16 in which the truncating includes setting the start and end addresses of the source and destination arrays to the window.

19. The graphics computer system of claim 16 in which the array move includes transferring only the pixel data whose destination addresses fall within the window.

20. A graphics system arrangement comprising:
A. host processing system terminals adapted for connection to a host processing system that determines the content of a visual display to be presented to a user by supplying host data;

B. graphics memory circuits including random access memory and other memory, said random access memory storing bit mapped display data signals representing said visual image and storing said host data, said random access memory and said other memory both storing instruction signals used for processing said host data and said display data;

C. graphics processing unit circuits connected to said host processing system terminals and said graphics memory circuits, said graphics processing unit circuits operating to transfer host data received at said host terminals to said graphics memory circuits and to process said host data and display data in response to said instruction signals stored in said graphics memory circuits, said graphics processing unit circuits including special graphics hardware circuits connected to said central processing unit circuits and operating in conjunction with and under control of the central processing unit circuits to process at least the host data in producing the display data, the special graphics hardware circuits including window checking circuits producing at least one output signal indicating the location of a pixel in one of a window and plural regions surrounding said window defined in an addressable destination array of pixels of said display data, and the central processing unit circuits and the special graphics hardware circuits operating to truncate the addresses of a source array of pixel data to the addresses of the window in the destination array while performing an array move when at least part of the destination addresses occur outside of the window;

D. video palette circuits coupled to said graphics memory circuits and operating to convert said bit mapped display data signals from said graphics memory circuits to video level output signals;

E. video connector terminals adapted for connection to a video display that presents a visual image to a user in response to received video image signals; and F. Converter circuits connected to said video palette signals and said video connector terminals for converting said video level output signals to video image signals at said video connector terminals.

21. The graphics system arrangement of claim 20 in which the window checking circuits indicate whether the addresses of the source array occurs outside of the window in the destination array.

22. The graphics system arrangement of claim 20 in which the truncating includes setting the start and end addresses of the source and destination arrays to the window.

23. The graphics system arrangement of claim 20 in which the array move includes transferring only the pixel data whose destination addresses fall within the window.

24. A display system, comprising:
A. a display generating a visual image for presentation to a user in response to receiving display data signals;
B. memory circuits storing host data and said display data and storing instruction signals used for processing said host data and said display data, said memory circuits producing said display data signals from said display data;
C. processor circuits including:
i. central processing unit circuits performing general purpose data processing, including a number of arithmetic and logic operations normally included in a general purpose processing unit, by executing said instructions accessed from said graphics memory circuits, said central processing unit circuits processing at least said host data to produce said display data in response to executing said instructions; and
ii. special graphics hardware circuits connected to said central processing unit circuits and operating in conjunction with and under control of the central processing unit circuits to process at least the host data in producing the display data, the special graphics hardware circuits including window checking circuits producing at least one output signal indicating the location of a pixel in one of a window and plural regions surrounding said window defined in an addressable destination array of pixels of said display data; and
iii. the central processing unit circuits and the special graphics hardware circuits operating to truncate the addresses of a source array of pixel data to the addresses of the window in the destination array while performing an array move when at least part of the destination addresses occur outside of the window; and D. a host system determining the content of said visual image by causing said host data to be placed in said memory circuits.

25. The display system of claim 24 in which the window checking circuits indicate whether the addresses of the source array occurs outside of the window in the destination array.

26. The display system of claim 24 in which the truncating includes setting the start and end addresses of the source and destination arrays to the window.

27. The display system of claim 24 in which the array move includes transferring only the pixel data whose destination addresses fall within the window.

28. A graphics processor comprising:
A. host interface circuits adapted for communication with a host processing system furnishing host data;
B. memory interface circuits adapted for communication of data and instructions with a memory storing said host data, display data and said instructions;
C. central processing unit circuits connected between said host interface circuits and said memory interface circuits, said central processing unit circuits performing general purpose data processing including a number of arithmetic and logic operations normally performed in a general purpose processing unit in response to executing said stored instructions, said central processing unit circuits processing at least said host data to produce said display data in response to executing said instructions; and
D. special graphics hardware circuits connected to said central processing unit circuits and operating in conjunction with and under control of the central processing unit circuits to process at least the host data in producing the display data, the special graphics hardware circuits including window checking circuits producing at least one output signal indicating the location of a pixel in one of a window and plural regions surrounding said window defined in an addressable destination array of pixels of said display data, the central processing unit circuits and the special graphics hardware circuits operating to truncate the addresses of a source array of pixel data to the addresses of the window in the destination array while performing an array move when at least part of the destination addresses occur outside of the window.

29. The graphics processor of claim 28 in which the window checking circuits indicate whether the addresses of the source array occurs outside of the window in the destination array.

30. The graphics processor of claim 28 in which the truncating includes setting the start and end addresses of the source and destination arrays to the window.

31. The graphics processor of claim 28 in which the array move includes transferring only the pixel data whose destination addresses fall within the window.

32. A graphics display system comprising:
A. processing unit circuits processing bit mapped display data to control the content of a user viewable display, said processing unit circuits including special graphics hardware circuits operating in conjunction with and under control of the processing unit circuits to process at least the display data to control the display, the special graphics hardware circuits including window checking circuits producing at least one output signal indicating the location of a pixel in one of a window and plural regions surrounding said window defined in an addressable destination array of pixels of said display data; and the processing unit circuits and the special graphics hardware circuits operating to truncate the addresses of a source array of pixel data to the addresses of the window in the destination array while performing an array move when at least part of the destination addresses occur outside of the window; and B. memory circuits connected to said processing unit circuits and storing said bit mapped display data, including said pixel, processed by said processing unit circuits, said memory circuits including a multibit serial output adapted to be connected to said user viewable display.

33. The graphics display system of claim 32 in which the window checking circuits indicate whether the addresses of the source array occurs outside of the window in the destination array.

34. The graphics display system of claim 32 in which the truncating includes setting the start and end addresses of the source and destination arrays to the window.

35. The graphics display system of claim 32 in which the array move includes transferring only the pixel data whose destination addresses fall within the window.

* * * * *